United States Patent [19]

Lancaster et al.

[11] Patent Number: 4,678,713

[45] Date of Patent: Jul. 7, 1987

[54] CO-EXTRUDED LAMINATES CONTAINING CARBON MONOXIDE INTERPOLYMERS

[75] Inventors: Gerald M. Lancaster, Surfside; James A. Allen, Lake Jackson, both of Tex.

[73] Assignee: The Dow Chemical Company, Midland, Mich.

[21] Appl. No.: 738,007

[22] Filed: May 28, 1985

Related U.S. Application Data

[63] Continuation-in-part of Ser. No. 645,990, Aug. 31, 1984, Pat. No. 4,601,948, which is a continuation-in-part of Ser. No. 531,110, Sep. 12, 1983, Pat. No. 4,600,614.

[51] Int. Cl.$^4$ .............................................. B32B 27/00
[52] U.S. Cl. .................................... 428/421; 428/520; 156/244.11; 528/392
[58] Field of Search ............................... 428/421, 520; 156/244.11; 528/392

[56] References Cited

U.S. PATENT DOCUMENTS

| | | | |
|---|---|---|---|
| 3,083,184 | 3/1963 | Loeb | 528/392 |
| 3,780,140 | 12/1973 | Hammer | 528/392 |
| 3,790,460 | 2/1974 | Weintraub | 528/392 |
| 4,489,193 | 12/1984 | Goswami | 525/231 |

*Primary Examiner*—Edith Buffalow
*Attorney, Agent, or Firm*—W. J. Lee

[57] ABSTRACT

Carbon monoxide-containing polymers are disclosed which are heatable with high frequency (HF) electromagnetic radiation, including RF-frequencies and MW-frequencies, and which are used in imparting RF-sealability in structures, packaging material, laminates, and the like, including, e.g., multi-wall bags or containers, and co-extruded laminates.

34 Claims, No Drawings

CO-EXTRUDED LAMINATES CONTAINING CARBON MONOXIDE INTERPOLYMERS

CROSS-REFERENCE TO RELATED APPLICATION

This application is a continuation-in-part of co-pending Ser. No. 645,990 filed Aug. 31, 1984 now U.S. Pat. No. 4,601,948 which is, itself, a continuation-in-part of co-pending application Ser. No. 531,110 filed Sept. 12, 1983, now U.S. Pat. No. 4,600,614.

FIELD OF THE INVENTION

Co-extruded multi-ply laminates, wherein at least one of the plies is a carbon monoxide-containing The use of high-frequency electromagnetic energy as a means of heating polymers is an advancing art which finds application in many fields, especially in fields in which conventional conductive, convective, or radiant heat energy is either not suitable, not practical, or not possible. For instance, sealing of a polymer to itself or to some other substrate can be (if the composition of the polymer is appropriate) an important commercial technique in producing a desired end-product.

There are some polymers which are not suitable, or at least not well-suited, for high-frequency heating operations. In such ill-suited polymers high-frequency heating either does not occur, or if it occurs it does so only after inefficiently prolonged periods of treatment time. In production assembly lines, e.g., a quick heat-seal operation is generally preferred over a prolonged heat-seal operation.

Among the polymers which are ill-suited for high-frequency heating are olefin polymers, e.g., polymers and copolymers of ethylene, propylene, styrene or other $\alpha$-olefinically unsaturated hydrocarbons having about 2 to about 10 carbon atoms. Some of these olefin polymers may contain polar groups, or polarizable groups, due to the incorporation therein of, e.g., acrylic (or methacrylic) acids or their alkyl esters as comonomers with the olefins, and these groups may, at high levels of incorporation tend to impart a modicum of high-frequency heatability to the polymer, but the efficacy is generally so slight that it is infeasible on a commercial basis. Some polymers having polar groups, e.g. chlorinated P.E., ethylene/vinyl acetate copolymer, PVC, polyvinylidene chloride, and polyamide, are heatable under the influence of certain frequencies of electromagnetic radiation, but are not generally well-suited for bonding using the higher frequencies.

Polyethylene is particularly known in the art to be substantially unsuitable for high-frequency heating unless sensitizers are added to the polymer; this is true regardless of whether it is linear or branched, or of whether it is low, medium, or high density (see, e.g., U.S. Pat. Nos. 3,336,173; 3,640,913; and 3,810,799).

It is an object of the present invention to provide ways and means for imparting improved high-frequency heatability to those olefin polymers and copolymers which ordinarily are found to be ill-suited for such heating operations, wherein co-extruded multiply laminates are prepared which have, as at least one ply, a carbon monoxide(CO)-containing polymer.

SUMMARY OF THE INVENTION

Multi-ply film laminates, wherein at least one of the plies is a carbon monoxide-containing interpolymer, are prepared by co-extrusion. The carbon monoxide-containing interpolymer provides RF-sealability, including MW-sealability, to the laminate. Preferably, the CO-containing polymer is ECO, ECOAA, ECOMAA, or ECOVA, especially ECOAA or ECOMAA.

DETAILED DESCRIPTIONS

The preparation of olefin polymers, copolymers, and terpolymers is well known and the methods and techniques are well known to practitioners of the relevant polymer art. For the most part, the olefin copolymers and terpolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used by selecting a catalyst (such as in U.S. Pat. No. 3,083,184) which is not easily poisoned or deactivated by carbon monoxide, or other oxygen-containing monomer, which is generally highly reactive with many metal-carbon bonds.

Olefin polymers within the purview of this invention, and which are rendered heatable (by high-frequency electromagnetic radiation) by incorporating carbon monoxide groups into the polymer chain, are polymers formed by polymerizing CO with monomers having ethylenic (olefinic) unsaturation. A sole olefin or a plurality of olefins may be used along with the carbon monoxide in preparing the polymers. Preferably the olefin monomer is ethylene (sometimes including a small proportion of a $C_3$–$C_8$ aliphatic olefin for property modification). The olefin monomer can also include an unsaturated organic acid having 3 to 8 carbon atoms, such as acrylic acid, methacrylic acid, 1-butenoic acid, and the like; alkyl esters or metal salts of these acids may also be used, such as ethyl acrylate, methyl methacrylate, 2-ethyl hexyl acrylate, sodium acrylate, potassium methacrylate, and the like. Hydrogenated CO-containing olefin polymers (which creates HC-OH groups along the polymer chain) are included here, such as hydrogenated ethylene/carbon monoxide copolymers. U.S. Pat. No. 2,495,292 discloses methods of hydrogenating such CO groups in a polymer chain.

It has been known for many years that olefins, e.g. ethylene, and carbon monoxide, can be copolymerized or terpolymerized.

The following listed patents are believed to be representative of the art pertaining to interpolymers of carbon monoxide and monoolefins: U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; and 4,304,887; and Canadian Pat. No. 471,169.

It is also known that there are additives (sensitizers) which can be blended into a polymer, e.g. polyethylene, to render it heatable by electromagnetic high-frequency energy, such as talc, $ZnCl_2$, carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" which can give irregular results and may even damage the polymer.

It is within the purview of one aspect of the present inventive concept to create high-frequency sensitizer groups along the polymer chain in polymers which otherwise would be ill-suited for high-frequency heating. In this invention one does not encounter untoward visual effects in the polymer as a result of the sensitizer. Even in the present embodiments wherein a polymer of the present invention is blended with polymer (e.g., as a "masterbatch") in order to sensitize the whole, the polymers are generally compatible to an extent at which little or no visual effects are encountered. Thus, clear films of olefin polymers can be prepared, in accordance with the present invention, which are readily heat-sealed using high-frequency energy. It is especially of importance that the present invention provides polymers which are heatable by the action of microwave (MW) energy, a particular portion of the high-frequency energy range, thereby helping to fill a need in the industry where there is a sparsity of polymers which are suitable. The amount of CO groups in the ethylene interpolymers should be in the range of about 0.1 to about 50% by weight, preferably about 1 to about 40% by weight, most preferably about 5 to about 30% by weight.

As used herein "high-frequency sealability" refers to the bonding of the sealable polymer to a portion of itself or to another material using electromagnetic energy frequencies of 0.1–30,000 MHz. This includes radio-frequency (RF) heating and microwave (MW) heating in contradistinction to conventional heat sealing. The high-frequency range is generally taken to include electromagnetic waves over a broad frequency range (0.01 to 30,000 MHz) and covers the ultrasonic frequency range (18 KHz–1000 KHz), the radio frequency (RF) range (1 MHz–300 MHz), and the microwave (MW) frequency range (300 MHz–10,000 MHz). The RF and MW ranges are of particular interest here, with special interest in the MW range due to the increasing use of MW as a processing device.

Uses for this technology (polymer or blends) includes packaging applications where high speed seals are required, e.g., high-frequency activated adhesive films; extrusion coatings; moldings; hot melts in uses such as aseptic packaging, retort pouches, sandwich bags; lamination of foam, fabric, or film layers; powder moldings, and the like. Furthermore, the present invention provides polymers suitable for use in RF extruders, including continuous extruders or batch extruders. Wire and cable coatings can be applied in a continuous RF-extruder by the present invention.

In one aspect, this invention relates to an improved method of rendering a polymer which is not heatable or sealable utilizing high-frequency (0.1–30,000 MHz) electromagnetic radiation (HF) (e.g., polyethylene, polypropylene, polystyrene, etc.) HF-sealable by either incorporation of carbon monoxide by copolymerization or by blending or grafting a carbon monoxide copolymer or terpolymer into the polymer matrix. Hydrogenated forms of the above can also be used. In addition, ethylene/carbon monoxide copolymer (ECO) and interpolymers containing CO can be used for microwave sealing applications (i.e., microwave sealable plastic bags, toothpaste tube sealing, shampoo tube sealing, other microwave sealable containers, valve bag sealing, etc.). We have unexpectedly found that ECO copolymers and interpolymers convert high-frequency electromagnetic radiation into heat for sealing, welding or fusing over a broad frequency range (0.1–30,000 MHz). Typically, ethylene copolymers may be heatable to some extent at low RF frequencies of 1–50 MHz (radio frequency range is typically considered to be from 1–300 MHz; microwave frequency range is 300–30,000 MHz) such as ethylene/vinyl acetate copolymer (EVA), but none have been found which efficiently heat at the higher frequencies. Other examples of polymers heatable at low frequencies, but which do not efficiently heat at the higher frequencies are polyvinyl chloride (PVC), polyvinylidene chloride (PVDC), chlorinated polyethylene (CPE), and Nylon 6.

The advantages of sealing polymers with high-frequency electromagnetic waves include faster and more efficient sealing, sealing through poor heat-conductors, e.g., paper or cardboard exteriors, stronger seals or bonds, improved economics based on efficient use of energy input, the ability to seal, bond, or laminate larger surface areas, sealing of thicker or more complex film laminates and specific sealing.

The general heating rate for the interaction of an electromagnetic wave can be used to determine sealing rates utilizing the following equation:

$$G = 13.3 \times 10^{-14} f F^2 (E' \tan \delta) \tag{1}$$

where G is the heating rate in cal/cm$^3$.sec, f is the frequency in Hz of the electromagnetic wave, F$^2$ is the field strength or power in volts/cm, E' is the dielectric constant of the polymer and tan $\delta$ is the dielectric loss tangent (measure of the heating property of the material when exposed to HF electromagnetic waves). Thus, in general (since tan $\delta$ varies with frequency) the higher the frequency the higher the heating rate or the faster the sealing ability of the material. The carbon monoxide (CO) containing interpolymers can be sealed or heated over a broad frequency range which allows one to have the option of using microwave frequencies for optimum speed in heating or sealing. This feature (heating or sealing over such a broad frequency) appears to be unique to these interpolymers or copolymers containing CO.

There are also advantages of CO copolymers or interpolymers over other polymers (e.g., PVC, PVDC, CPE, EVA), that are sealable using radio frequency sealing methods which include, for example:

1. ECO is like conventional low density polyethylenes in physical properties and film appearance, i.e., higher melting point, low film blockage, easy processability, can be used for film, extrusion coating and molding resin. Furthermore, the need for plasticizers is obviated.
2. CO can be copolymerized with ethylene and vinyl acetate to produce a CO-modified EVA polymer to render it more sealable and broadens the sealing frequency range. CO can also be copolymerized into an EAA or EMAA polymer allowing an EAA-like or EMAA-like terpolymer to be RF and microwave sealable (EAA and EMAA are not RF or microwave sealable). This includes the metal salts or "ionomer-type" embodiments of these polymers.
3. CO containing copolymers or interpolymers have higher dielectric constants than EVA copolymers, allowing higher field strengths to be used without the fear of arcing.

EXAMPLE 1

The following Table I shows the time required to melt a polymer in a microwave oven (Sears Microclassic microwave oven) at maximum power (brought 275 ml of water to boil in 2.48 minutes).

TABLE I

| Resin* | MI*** | Melt Time (sec)** |
|---|---|---|
| ECO | | |
| 10% CO | 1 | 37 |
| 10% CO | 10 | 35 |
| 5% AA; 10% CO | 10 | 75 |
| 5% AA; 10% CO | 3.5 | 85 |
| 5% AA; 5% CO | 3 | 90 |
| 1% CO | 1· | 90 |
| EVA (14% VA) | wax | >10 min |
| EAA (12% AA) | wax | >10 min |
| Oxidized (PE) | wax | >10 min |
| E/vinyl alcohol | — | 42 |
| EVA/CO (20% CO) | — | 25 |
| EVA | | |
| 28% VA | 3.5 | >10 min |
| 18% VA | 3.0 | >10 min |
| EAA | | |
| 20% AA | 300 | >10 min |
| 30% AA | 1250 | >10 min |
| HDPE (0.965 dens.) | .8 | >10 min |
| LDPE (0.918 dens.) | 6 | >10 min |
| LLDPE (0.918 dens.) | 6 | >10 min |
| Nylon ®-6 resin (dried) | — | >10 min |
| Saran ® B-2000 polymer | — | >10 min |
| Chlorinated P.E. (CPE) | — | >10 min |

*Samples were 2" discs of 60 mil thickness, positioned on a non-RF sensitive polycarbonate sheet.
**If no melting was evident in 10 minutes, the test was stopped and reported as >10 min.
***MI is melt index in accordance with ASTM D-1238.
®Registered tradenames As can be seen from Table I, only ethylene/vinyl alcohol (EVOH) copolymer and ethylene interpolymers containing carbon monoxide melted in the microwave oven (2450 MHz).

EXAMPLE 2

In order to determine the RF-sealability of carbon monoxide containing copolymers, a Callanan 1½ KW high-frequency electronic generator equipped with a 3/32"×12" brass sealing electrode and operating over a frequency range of 20–40 MHz (RF) was utilized in the following sealing experiment. Samples of 3 mil blown film of the copolymers shown in Table II were attempted to be sealed using the above RF sealer utilizing various dwell settings (sealing time) and power settings. The seals were examined and a seal was considered to have been made when the two sheets of material could not be separated at the seal point without tearing either piece of film. Table II also shows the improvement in minimum sealing time and resistance to arcing of CO containing copolymers in comparison to EVA copolymers.

TABLE II

RADIO FREQUENCY SEALABILITY

| Resin | Power Setting | Dwell Time sec. | Sealability |
|---|---|---|---|
| EVA (9.3% VA, 2 MI) | 90 | 3 | No |
| | 100 | 3 | No |
| | 100 | 4 | Arc* |
| EVA (18% VA, 2.5 MI) | 10 | 1 | No |
| | 40 | 2 | No |
| | 70 | 2 | Yes |
| | 60 | 2 | Yes |
| | 70 | 1 | No |
| | 80 | 1 | Yes |
| | 90 | 2 | Arc |
| EVA (12.0% VA, 2.5 MI) | 60 | 2 | No |
| | 70 | 2 | No |
| | 80 | 2 | No |
| | 90 | 2 | Yes |
| | 100 | 1 | Arc |
| EVA (25% VA, 2 MI) | 30 | 2 | Yes |
| | 20 | 2 | No |
| | 60 | 1 | Yes |
| | 60 | .5 | No |
| | 70 | .5 | No |
| | 80 | .5 | Arc |
| EVA (28% VA, 3.0 MI) | 40 | 2 | Yes |
| | 20 | 1 | Yes |
| | 70 | .5 | Yes |
| | 80 | .25 | Arc |
| | 80 | .5 | Arc |
| ECO (10% CO, 1 MI) | 50 | 2 | No |
| | 60 | 2 | No |
| | 70 | 2 | Yes |
| | 100 | 1 | Yes |
| | 90 | 1 | Yes |
| | 80 | 1 | No |
| | 100 | .5 | Yes |
| | 90 | .5 | No |
| E/AA/CO (5% AA, 10% CO, 3.5 MI) | 70 | 2 | Yes |
| | 60 | 2 | Yes |
| | 50 | 2 | Yes |
| | 70 | 1 | Yes |
| | 60 | 1 | Yes |
| | 70 | .5 | Yes |
| | 60 | .5 | No |
| | 80 | .25 | No |
| | 90 | .25 | Yes |
| E/AA/CO (5% AA, 10% CO, 10 MI) | 70 | .5 | Yes |
| | 80 | .5 | Yes |
| | 80 | .25 | No |
| | 90 | .25 | Yes |

*Arc results in a hole burned through the film.

Within the purview of the present invention, useful articles are prepared which utilize the high-frequency electromagnetic radiation heatability and sealability of the above described CO containing olefin polymers. Layers or plies of these polymers are used as a means for sealing or bonding materials which are not, themselves, efficiently suitable for high-frequency electromagnetic radiation sealing or bonding. Various substrates, including particles, films, sheets, blocks, rods, spheres, and the like can be coated, at least in the area desired to be bonded, with these subject polymers and then sealed or bonded together using high-frequency electromagnetic radiation, especially those frequencies in the microwave range. These polymers, in the form of powders or particles, may be extruded into useful shapes, or as coatings onto other materials (e.g. wire and cable coatings), using high-frequency electromagnetic radiation as the heating means.

Novel adhesives comprising terpolymers of ethylene/carbon monoxide/carboxylic acid are prepared as embodiments in accordance with the present invention. The carboxylic acid moiety of the terpolymer may be any of the unsaturated carboxylic acid which are polymerizable through the double-bond, such as acrylic acid, methacrylic acid, crotonic acid, 1-butenoic acid, and the like, especially acrylic acid or methacrylic acid, most especially acrylic acid, including salts of these acids, such as metal salts, especially Na or K salts, commonly known as "ionomer" salts. The preparation of these E/CO/acid terpolymers may be done in the same manner as the E/acid copolymers as disclosed in U.S. Pat. Nos. 3,520,861 and 4,351,931. These patents disclose the use of a high pressure stirred autoclave reactor, using a free-radical initiator, to prepare uniform, random ethylene/carboxylic acid copolymers. Whereas these terpolymers can also be made by grafting techniques, by block polymerization techniques, in batch reactors, or in long tube reactors, it is preferred that the above disclosed stirred autoclave reactors be used whereby substantially uniform, random terpolymers are made.

Even though E/AA copolymers are generally regarded as having good adhesive properties with many substrates, as compared to polyethylene, there are some substrates where improved adhesion is desirable. Notable among these substrates, where improved adhesion is desirable, are polyamides (e.g. nylons), polyolefins (e.g. LDPE, HDPE, LLDPE, PP, OPP, polyisoprene), fluoropolymers (e.g. PTFE), polyethylene terephthalate (PET), metals (e.g. steel and aluminum foil), some paper-type products (e.g. glassine, kraft paper, etc.), cured epoxy resins, ethylene/vinyl alcohol copolymers, cured novolac resins, polyurethanes, polycarbonates, chloropolymers (e.g. polychloroprene, PVC, polyvinylidene chloride, PVDC), and inorganic substrates (e.g. glass and porcelain).

Conversely, whereas ECO copolymers exhibit a modicum of heat-activated or heat-induced adhesive properties to some substrates, it has been determined that the present E/CO/acid terpolymers exhibit greater adhesiveness in such instances, especially to such substrates as SARAN polymer and polycarbonate (where ECO has some adhesiveness) and to ethylene/vinyl alcohol copolymers, nylon, and aluminum (where ECO exhibits little or no adhesiveness).

The adhesive properties of these E/CO/acid terpolymers may be utilized by any convenient method, such as by hot-melt application, by post-heating of the adhesive in-situ on the substrate, by application of the adhesive in a carrier, such as in a solvent or as a dispersion in an aqueous carrier or in a non-solvent. The adhesive may be used in joining substrates of similar or dissimilar materials. As mentioned hereinbefore, these terpolymers are also suitable for use as films or as other materials and have the beneficial property of being high-frequency heatable, especially at those frequencies which are in, or near, the microwave range.

These E/CO/acid terpolymers are quite similar in optics and physical properties to EAA copolymers made by the same process. Insofar as these novel adhesive terpolymers are concerned, the ranges of the comonomer ingredients are as follows:

| Monomer | Weight % of Terpolymer | | |
|---|---|---|---|
| | Operable | Preferred | Most Preferred |
| Ethylene | 20–98 | 40–98 | 60–96 |
| Carbon Monoxide | 1–40 | 1–30 | 2–20 |
| Carboxylic Acid | 1–40 | 1–30 | 2–20 |

The melt index (M.I.), also called melt flow rate, as measured in accordance with ASTM D-1238, is preferably in the range of about 0.5 to about 2500, most preferably in the range of about 1 to about 60, even more preferably in the range of about 1 to about 20.

These E/CO/acid terpolymers are thermoplastic and can be thermoformed into films, sheets, tubes, or other articles. Powders of these terpolymers can be compression molded into sintered forms or the powders can be applied to the surface of a substrate where it can be heat-plastified to provide an adhesive layer or coating on the substrate or between two substrates. A film, strip, or sheet of these terpolymers can be placed between two substrates and heat-plastified to serve as an adhesive or laminate layer to hold the substrates together.

The following examples illustrate certain embodiments of the E/CO/acid terpolymers, compared with other polymers, but the invention is not limited to the specific embodiments shown.

EXAMPLE 3

The examples shown in Table III below are produced by compression molding at pressures and temperatures conducive to heat fusion. The resin samples to be tested for adhesion are first compression molded into 20 mil (0.5 mm) plaques and then laminated to the substrate (a film or plaque) to test for adhesion to the substrate. The adhesive of ethylene/carbon monoxide/acrylic acid terpolymers, E/CO/AA, is shown in comparision to low density polyethylene, LDPE; ethylene/acrylic acid copolymer; E/AA; ethylene/vinylacetate copolymer, E/VA; ethylene/carbon monoxide copolymer, E/CO; and ethylene/carbon monoxide/vinyl acetate terpolymer, E/CO/VA. The good adhesiveness obtainable with E/CO/AA terpolymers to the various substrates is evident, especially with nylon (a polyamide) and with polycarbonate which generally do not form strong bonds with most heat-plastified adhesives.

TABLE III

| | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| ADHESIVE | AA | CO | VA | MI | A[1] | B[2] | Nylon[3] | Aluminum[4] | EVAL[5] | Polycarbonate[6] |
| LDPE | — | — | — | — | .01 | .01 | .01 | .05 | .01 | .01 |
| E/AA Copolymer | 6.2 | — | — | 3.02 | .01 | .02 | 2.4 | 18.1 | .50 | .05 |
| E/AA Copolymer | 9.8 | — | — | 9.6 | .01 | .01 | 3.8 | 29.2 | .70 | .08 |
| E/AA Copolymer | 9.0 | — | — | 3.6 | .01 | .01 | 4.2 | 27.4 | .50 | .08 |
| E/VA Copolymer | — | — | 28.5 | 5.8 | 7.5 | 6.3 | 5.4 | 2.1 | 3.1 | .08 |
| E/VA Copolymer | — | — | 6.5 | 1.11 | .04 | .10 | 6.44 | 8.9 | 6.8 | .05 |
| E/CO/AA Terpolymer | 5.0 | 5.0 | — | 56.1 | >10.47 | >2.39 | 1.83 | 18.0 | 3.1 | 7.5 |
| E/CO/AA Terpolymer | 5.0 | 10.0 | — | 4.3 | 11.8 | >1.89 | 9.88 | 16.0 | 7.5 | >10.4 |
| E/CO/AA Terpolymer | 5.0 | 10.0 | — | 18.7 | 9.0 | >4.2 | >23.2 | 22.5 | 7.9 | >10.4 |
| E/CO Copolymer | 0 | 10.0 | — | 7 | 9.6 | >2.4 | .5 | .4 | .2 | >7.8 |
| E/CO Copolymer | 0 | 10.0 | — | 8.2 | 10.3 | >4.1 | .1 | .8 | .5 | >8.2 |
| E/CO/AA Terpolymer | 10.0 | 5.0 | — | 4.1 | 7.1 | 1.5 | >24.2 | 24.9 | 6.9 | DNR |

TABLE III-continued

| | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| ADHESIVE | AA | CO | VA | MI | A[1] | B[2] | Nylon[3] | Aluminum[4] | EVAL[5] | Polycarbonate[6] |
| E/CO/VA Terpolymer | — | 10.0 | 10.0 | 35.2 | 8.2 | 6.1 | 8.8 | 2.0 | 1.33 | DNR |

> indicates cohesive failure strength of film substrate
[1] 6-mil (0.15 mm) SARAN PVDC film
[2] 2-mil (0.051 mm) SARAN PVDC film
[3] Nylon-6 film
[4] Aluminum
[5] ethylene/vinyl alcohol copolymer, molded 20-mil (0.51 mm) plaque
[6] 2-mil (0.051 mm) polycarbonate cast film

EXAMPLE 4

In order to compare an ethylene/carbon monoxide copolymer (10% CO by weight, 18.7 M.I.) with an ethylene/carbon monoxide/acrylic acid terpolymer (10% CO and 5% AA by weight, 12.8 M.I.), a 2-mil thick coating of each is extrusion-coated onto various substrates and adhesion (lb./in.) is measured. In Table IV below, Sample A is the E/CO copolymer and is extrusion-coated at about 300° C.; Sample B is the E/CO/AA terpolymer and is extrusion-coated at about 290° C.; PVDC means polyvinylidene chloride; EVAL means ethylene/vinyl alcohol copolymer; LLDPE means linear low density polyethylene; LDPE means low density polyethylene; PET means polyethylene terephthalate; OPP means oriented polypropylene.

TABLE IV

| SAMPLE | PVDC | PET | POLYAMIDE | OPP | ALUMINUM | LDPE | LLDPE |
|---|---|---|---|---|---|---|---|
| A | >5* | 0.5 | 0.32 | <0.05 | 0.14 | 0.3 | 0.07 |
| B | >5* | 1.6 | 2.44 | 0.05 | 2.5 | 0.5 | 0.5 |

*All ">" samples resulted in film failure, not adhesive failure. The above illustrates the superior adhesiveness of E/CO/AA terpolymers as compared to E/CO copolymers.

EXAMPLE 5

The packaging industry utilizes a number of barrier resins, such as in Table V below, and the E/CO/acid terpolymers are found to make good adhesives for making laminates which contain one or more barrier layers.

TABLE V

| | Oxygen Barrier Resistance |
|---|---|
| Nominal Value* | Polymer |
| 0.03–0.30 | ethylene/vinyl alcohol copolymers; EVAL |
| 0.05–0.20 | polymers or copolymers based in vinyl chloride and/or vinylidene chloride monomers; SARAN polymers |
| 2 | polyvinyl chloride, PVC |
| 80 | plasticized PVC |
| 4 | PET, polyethylene terephthalate |
| 10 | nylon, polyamide |
| 125 | HDPE, high density polyethylene |

*cc of $O_2$ as determined by ASTM D-1434

EXAMPLE 6

It has been determined that E/CO/acid terpolymers are useful as heat-plastified adhesives between layers of similar plastics or resins, layers of dissimilar plastics or resins, and/or between layers of plastics or resins and completely different substrates, such as paper, cloth, metal, glass, vitreous material, wood, leather. These terpolymers are also useful as heat-plastified adhesives between layers of materials, neither layer being plastic or resin, such as the materials named immediately above.

Co-extrusion techniques, and apparatuses therefor, are well known, such as in U.S. Pat. Nos. 3,223,761; 3,423,498; 3,557,265; 3,576,707; and British Pat. No. 1,115,004.

In a general sense, co-extrusion involves the extrusion of molten or plastified polymers through adjacent dies in a manner whereby the extrudates, still in molten, semi-molten, or plastified form, are brought together to form multi-ply laminates. The number of plies which can be solaminated generally ranges from 2 to as many as about 1000 or more, though technically the number of plies is virtually unlimited. The thickness of each ply usually is in the range of about 0.05 mils-30 mils (0.00127 mm to about 0.762 mm) or more, depending on the desired result or end-use. The plies can all be virtually of the same thickness or may each have its own thickness independent of the others. The material used in each ply is usually different from any adjacent ply, but it can be repeated in the same multi-ply laminate.

The multi-ply laminates prepared by co-extrusion can also be laminated to a substrate which is not co-extruded therewith, such as paper, metal, fabric, wood, glass, resin, or another plastic or polymer.

The presently claimed invention involves the use, in a multi-ply co-extruded laminate, of at least one ply comprising a carbon monoxide-containing interpolymer, especially at least one of those identified herein as ECO, ECOAA, ECOMAA, or ECOVA. Preferably there is also at least one ply of a halopolymer in the co-extruded laminate.

EXAMPLE 8

The following coextruded test structures were produced on a coextrusion cast film line. The line consisted of a 2.5-inch screw diameter skin layer extruder (A), a 2-inch screw diameter adhesive layer extruder (B), and a 1.25-inch screw diameter core layer extruder (C) equipped with a feedblock and die. The line was set up to produce a A/B/C/B/A type coextruded product. The layer thicknesses were 0.0018 cm/0.0005 cm/0.0005 cm/0.0005 cm/0.0018 cm, respectively and results in a 0.005/cm thick film. The skin layer (A) was a LDPE resin with a melt index of 1.15 g/10 min and a 0.922 g/cc density. The resin is available from The Dow Chemical Company as LDPE 681. The core layer (C) was a PVDC/vinyl chloride copolymer available from Dow as Saran 5253.12. A typically used EVA adhesive resin was used as a "control". The resin selected was an EVA copolymer with a VA content of 28 wt. % and a melt index of 5 (a product available from DuPont as EVA 3294). For comparison to the "control" there was used an ECO copolymer (10% CO, 2.5 M.I.) as the adhesive layer (B) as an illustration of an embodiment of the presently claimed invention. Comparison data are shown below in Table VI, demonstrating that ECO substantially overcomes loss of interlayer adhesion strengths at elevated temperatures.

TABLE VI

| Adhesive Layer (B) | Interlayer[1] Adhesion (lbs/in) 100° C. | Transmission[2] Rate of $O_2$ | Water Vapor[3] Transmission Rate | Tensile[4] Strength psi |
|---|---|---|---|---|
| EVA (Control) | 0 | 0.65 | 0.27 | 2450 |
| ECO (Invention) | 2.0 | 0.65 | 0.28 | 3410 |

[1] The interlayer adhesion was measured by partially delaminating the layers utilizing methyl ethyl ketone and inserting the loosened portions of the sample into the jaws of a tensile testing piece of equipment (Instron) such that the skin layer (A) was peeled from the rest of the film structure at a rate of 2 in/min.
[2] The $O_2$ transmission rate was measured on a Mocon Oxygen Transmission rate analyzer and the units are reported in cc/100 in[2] 24 hr atm and was tested at 28° C.
[3] The water vapor transmission rate was measured on a Mocon WVTR analyzer and the units are reported in gms/100 in[2] 24 hrs atm and was tested at 38° C. and 90% relative humidity.
[4] The tensile strength of the film was determined via ASTM D882.

We claim:

1. A co-extruded, multi-ply laminate comprising at least two different extrudable polymers wherein at least one ply comprises a carbon monoxide-containing polymer which is adhered to a ply comprising at least halopolymer.

2. The laminate of claim 1 wherein there is at least one chloropolymer ply.

3. The laminate of claim 1 wherein the carbon monoxide-containing polymer comprises at least one of the group comprising ECO, ECOAA, ECOMAA, and ECOVA.

4. The laminate of claim 1 wherein the carbon monoxide-containing polymer comprises ECO.

5. The laminate of claim 1 wherein the carbon monoxide-containing polymer comprises of ECOAA.

6. The laminate of claim 1 wherein the carbon monoxide-containing polymer comprises ECOMAA.

7. The laminate of claim 1 wherein the carbon monoxide-containing polymer comprises ECOVA.

8. The laminate of claim 1, characterized by the property of being RF-sealable by virtue of the carbon monoxide-containing polymer.

9. The laminate of claim 1 wherein there is at least one ply of a halopolymer selected from the group comprising chloropolymers, fluoropolymers, and chlorofluoropolymers.

10. The laminate of claim 1 wherein there is at least one ply of a halopolymer selected from the group comprising poly(vinyl chloride), poly(vinylidene chloride), and poly(vinyl chloride)(vinylidene chloride).

11. The co-extruded, multi-ply, film laminate material comprising at least one ply of a melt-extrudable carbon monoxide-containing ethylene polymer and at least one ply of a melt-extrudable halopolymer.

12. The laminate material of claim 11 wherein the carbon monoxide-containing ethylene polymer is at least one of the group comprising E/CO, E/CO/AA, E/CO/VA, and E/CO/MAA.

13. A laminate material of claim 11 wherein the halopolymer comprises polymers having pendant chloride and/or fluorine groups.

14. The laminate material of claim 11 wherein the halopolymer comprises chloropolymers, fluoropolymers, or chlorofluoropolymers.

15. The laminate material of claim 11 wherein the halopolymer comprises at least one of the group comprising polyvinyl halide, polyvinylidene halide, and poly(vinylidene halide)(vinyl halide).

16. The laminate material of claim 11 wherein the halopolymer comprises at least one of the group comprising polyvinyl chloride, polyvinylidene chloride, and poly(vinylidene chloride)(vinyl chloride).

17. The laminate material of claim 11 wherein the carbon monoxide-containing ethylene polymer and the halopolymer comprise adjacent plies.

18. The laminate material of claim 11 wherein the carbon monoxide-containing ethylene polymer is a ply between two plies of the halopolymer.

19. The laminate material of claim 11 wherein the halopolymer is a ply between two plies of the carbon monoxide-containing ethylene polymer.

20. The laminate material of claim 11 wherein the halopolymer is a ply between a ply of carbon monoxide-containing ethylene polymer and a ply of a different melt-extrudable polymer.

21. The laminate material of claim 11 wherein the carbon monoxide-containing ethylene polymer is a ply between a ply of halopolymer and a ply of a different melt extrudable polymer.

22. The laminate material of claim 11, adhered to a substrate which was not co-extruded therewith.

23. The article comprising a substrate having adhered thereto a co-extruded, multi-ply, film laminate material, said laminate material comprising at least one ply of melt-extrudable carbon monoxide-containing ethylene polymer and at least one ply of a halopolymer.

24. The article of claim 23 wherein the carbon monoxide-containing ethylene polymer is at least one of the group comprising E/CO, E/CO/AA, E/CO/VA, and E/CO/MAA.

25. The article of claim 23 wherein the carbon monoxide-containing ethylene polymer is E/CO.

26. The article of claim 23 wherein the carbon monoxide-containing ethylene polymer is E/CO/AA.

27. The article of claim 23 wherein the carbon monoxide-containing ethylene polymer is E/CO/MAA.

28. The article of claim 23 wherein the carbon monoxide-containing ethylene polymer is E/CO/VA.

29. The article of claim 23 wherein the halopolymer comprises chloropolymers, fluoropolymers, or chlorofluoropolymers.

30. The article of claim 23 wherein the halopolymer comprises at least one of the group comprising polyvinyl halide, polyvinylidene halide, and poly(vinylidene halide)(vinyl halide), where each halide is chloride or fluoride.

31. The article of claim 23 wherein the halopolymer comprises at least one of the group comprising polyvinyl chloride, polyvinylidene chloride, and poly(vinylidene chloride)(vinyl chloride).

32. The article of claim 23 wherein the substrate comprises at least one material selected from the group comprising plastics, resins, paper, fabric, metal, ceramic, wood, glass, and cellulosic material.

33. The article of claim 23 wherein the substrate comprises a multi-ply material having two or more dissimilar plies, wherein each ply comprises at least one material selected from the group comprising plastics, resins, paper, fabric, metal, ceramic, wood, glass, and cellulosic material.

34. The laminate material comprising co-extruded, co-adhered, layers of a carbon monoxide-containing polymer and a halopolymer.

* * * * *

UNITED STATES PATENT AND TRADEMARK OFFICE
CERTIFICATE OF CORRECTION

PATENT NO. : 4,678,713

DATED : July 7, 1987

INVENTOR(S) : Gerald M. Lancaster, et al.

It is certified that error appears in the above-identified patent and that said Letters Patent is hereby corrected as shown below:

Col. 1, line 15, after the word "monoxide-containing" please insert -- interpolymer --.

Col. 1, between line 15-16 the phrase -- Background of the Invention -- is missing.

Col. 11, line 34, after the word "least" insert --one--.

Col. 11, line 40, "anc" should be --and--.

Signed and Sealed this

Twelfth Day of April, 1988

Attest:

DONALD J. QUIGG

*Attesting Officer*       *Commissioner of Patents and Trademarks*